Patented Dec. 7, 1948

2,455,581

UNITED STATES PATENT OFFICE 2,455,581

STABILIZED CELLULOSE ESTER COMPOSITIONS

Richard M. Hitchens, Webster Groves, Mo., assignor to Monsanto Chemical Company, St. Louis, Mo., a corporation of Delaware No Drawing. Application March 14, 1946, Serial No. 654,515

5 Claims. (Cl. 106—178)

This invention relates to new compositions of matter comprising cellulose derivatives such as cellulose esters of lower fatty acids and nitrocellulose, a plasticizer therefor and benzyl benzoate.

It is an object of this invention to provide light-resistant and weather-resistant plastic compositions.

It is a further object of this invention to provide improved compositions of matter comprising a cellulose derivative such as a cellulose ester or nitrocellulose, a suitable plasticizer therefor and benzyl benzoate.

Other objects will become apparent from the following specification and examples.

According to the present invention, generally stated, compositions comprising a cellulose derivative such as a cellulose ester, for example cellulose acetate or cellulose acetate butyrate, or nitro cellulose, a suitable plasticizer such as dibutyl phthalate, diethyl phthalate, triphenyl phosphate, tricresyl phosphte or dibutyl sebacate and benzyl benzoate have been found to possess very useful properties. Outstanding among the valuable characteristics of these new compositions is their resistance to ultra-violet rays and to outdoor exposure. In these respects these new compositions are greatly superior to compositions comprising cellulose acetate, cellulose acetate-butyrate or nitrocellulose plasticized with a suitable plasticizer or similar compositions containing in addition thereto a small portion of phenyl salicylate, which is used in the art as an ultraviolet light stabilizer.

In preparing the new compositions of the present invention, a cellulose ester such as cellulose acetate or cellulose acetate-butyrate is blended with a suitable plasticizer as diethyl phthalate, dibutyl sebacate, triphenyl phosphate, dibutyl phthalate or tricesyl phosphate in the presence of benzyl benzoate by any suitable means. Thus for example, the components may be dissolved in a suitable solvent, for example acetone, and cast from the solution as films. The components may also be blended on hot rolls, for example at 80–100° C. in the presence of sufficient solvent to facilitate blending, the solvent being removed by evaporation on the rolls. The plastic mass thus obtained may then be molded as a sheet by means of a hydraulic press at suitable temperatures, for example 100–120° C.

My invention may also be practiced with nitrocellulose using any suitable plasticizer, for example dibutyl phthalate or tricresyl phosphate and incorporating benzyl benzoate. Any desired procedure may be employed for formulation, for example either the solvent method or casting of films or the hot roll method for preparing a plastic mass for use in molding sheets and other objects.

The proportions of plasticizer employed in the composition of the present invention may be varied over a wide range in accordance with the established practice in preparing cellulose ester or nitrocellulose plastic compositions. The range generally employed is that of 15—15 parts of plasticizer for 100 parts of cellulose derivative. The proportions of benzyl benzoate employed in the composition may be varied from 1 part per 100 parts of the cellulose derivative to the limit of compatability of benzyl benzoate in the cellulose-plasticized composition. The amount of benzyl benzoate employed may be considered as replacing part of the plasticizer, for example using 45 parts of plasticizer and 5 parts of benzyl benzoate per 100 parts of cellulose derivative in place of 50 parts of plasticizer. As an alternative, the amount of benzyl benzoate employed may be in addition to the amount of plasticizer normally employed, as for example with 50 parts of plasticizer and 10 parts of benzyl benzoate per 100 parts of cellulose derivative.

I have found that the desired range of concentration of benzyl benzoate for the accomplishment of the purposes of the present invention is that of 1–5 parts per 100 parts of cellulose derivative. The compatibility limit of benzyl benzoate in the compositions of the present invention varies over a wide range and depends upon the properties of the cellulose ester or nitrocellulose and of the plasticizer selected therefor. It is impossible to set forth a fixed upper limit of compatibility of benzyl benzoate for the purposes of the present invention because the variety of plasticizers and the variety of cellulose derivatives to which benzyl benzoate may be applied for the accomplishment of the purposes of the present invention is very extensive and the proportions of cellulose derivative to plasticizer give rise to further wide variations in properties with the net result that the amount of benzyl benzoate which may be incorporated in the plastic composition without exceeding the compatibility limit and with a view toward attaining a specific set of characteristics or properties in the resulting plastic composition varies with the particular composition prepared. I have found, however, that as little as one part of benzyl benzoate per 100 parts of cellulose derivative in the plastic composition gives rise to unexpected and highly desirable properties of light resistance and weather resistance of an order superior in many respects to that obtained with the use of one part of previously known and used light screening agents such as phenyl salicylate. I have further found that 1 to 15 parts of benzyl benzoate per 100 parts of cellulose derivative is compatible with nitrocellulose and with cellulose ester plastic compositions regardless of the type or amount of plasticizer employed. For most instances, the use of 1-5 parts of benzyl benzoate is satisfactory. The following are specific examples illustrating the utility of the new products of the present invention. All parts are parts by weight.

*Example I*

Plastic compositions comprising 100 parts of nitrocellulose, RS ½ sec., 20 parts of dibutyl phthalate and amounts of benzyl benzoate ranging from substantially 1 part to substantially 15 parts were dissolved in a sufficient quantity of a solvent comprising equal volumes of toluene and butyl acetate to form individual solutions containing substantially 10% of said plastic compositions. Other plastic compositions comprising 100 parts of nitrocellulose, RS ½ sec., 20 parts of dibutyl phthalate and amounts of phenyl salicylate ranging from substantially 1 part to substantially 15 parts were dissolved in a sufficient quantity of a solvent comprising equal volumes of toluene and butyl acetate to form individual solutions containing substantially 10% of the plastic composition.

The above described solutions were applied to opal-glass panels and the resulting films were allowed to dry for 48 hours at room temperature. Thereafter these films were exposed for approximately 100 hours to the rays in a National X-1A weathering unit, using Sunshine carbons and Corex "D" filters in the absence of a water spray. An examination showed that the compositions containing benzyl benzoate possessed substantially less coloration due to ultra-violet light and weathering than the corresponding compositions containing similar proportions of phenyl salicylate. Moreover, the exposed films containing benzyl benzoate exhibited an increasing resistance to the effects of light with increased benzyl benzoate content up to approximately 5% and thereafter the improvement in resistance in light resistance appeared to level off, indicating that for the purpose of the composition prepared, amounts of benzyl benzoate above 5% were in excess of that required to provide light stability to the particular plastic compositions prepared in this instance. In other tests, it was found that the amount of benzyl benzoate required for light stability of the composition varied to some extent with the proportions of plasticizer employed in the composition. The greatest amount of variation in the amount of benzyl benzoate required for light stability, however, was found when the type of plasticizer was varied. For example, plastic compositions comprising 100 parts nitrocellulose, RS ½ sec., 20 parts of tricresyl phosphate and amounts of benzyl benzoate ranging from substantially 1 part to substantially 25 parts were prepared for the method described hereinabove and were exposed according to the procedure described to the weathering unit. It was found that those compositions containing in excess of 5% of benzyl benzoate possessed superior light-resistant and weathering characteristics, although a marked degree of light resistance was provided even in those compositions containing as little as 1% of benzyl benzoate.

*Example II*

Plastic compositions comprising 100 parts of nitrocellulose, 20 parts of dibutyl phthalate and amounts of benzyl benzoate ranging from substantially 1 part to substantially 15 parts of benzyl benzoate were blended on hot rolls in the presence of sufficient acetone to facilitate the working of the components on the rolls at a temperature of 80-110° C. The plastic mass was worked on the rolls until the components of the mass were thoroughly blended. Thereafter the mass was removed from the rolls and molded into the form of a sheet in a hydraulic press at a temperature of 100-120° C. The sheets thus obtained were exposed for approximately 100 hours in the weathering unit described in Example I and were thereafter compared first with similar compositions containing 25 parts of dibutyl phthalate and no light screening agent and also with similar compositions containing 20 parts of dibutyl phthalate and amounts of phenyl salicylate ranging from substantially 1 part to substantially 15 parts. The comparison indicated a very substantial improvement in light resistance in the plastic sheets containing benzyl benzoate over those containing phenyl salicylate in the same amount. The nitrocellulose sheets containing no light screening agent were very strongly darkened by exposure in the weathering unit.

*Example III*

Plastic compositions comprising 100 parts of cellulose acetate, 45 parts of diethyl phthalate and amounts of benzyl benzoate ranging from substantially 1 part to substantially 15 parts were dissolved in sufficient quantity of acetone to form individual solutions containing substantially 10% of said plastic composition. The above described solutions were applied to opal-glass panels and the resulting films were allowed to dry for 48 hours at room temperature. Thereafter these films were exposed approximately 100 hours in a National X-A weathering unit using Sunshine carbons and Corex "D" filters in the absence of a water spray. The colors of the exposed films were compared with the colors of similarly exposed films prepared from compositions containing in place of benzyl benzoate similar proportions of phenyl salicylate. An examination showed that the films of the composition containing benzyl benzoate in each instance possessed less color than those containing comparable proportions of phenyl salicylate, and furthermore the exposed films containing benzyl benzoate exhibited an increasing resistance to the effects of light with increasing amounts of benzyl benzoate contained in the compositions. In contrast to the above results, a similarly prepared film containing 100 parts of cellulose acetate and 50 parts of diethyl phthalate, after an exposure identical with that described above, possessed very strong coloration and were very unstable to ultra-violet light.

*Example IV*

Films similar to those described in Example III but containing in place of diethyl phthalate a similar quantity of triphenyl phosphate were prepared according to the procedure described in Example III and were exposed in the weathering unit. The films containing benzyl benzoate were found to possess superior resistance to the effects of light.

Example V

Plastic compositions comprising 100 parts of cellulose acetate-butyrate, 15 parts of dibutyl sebacate and amounts of benzyl benzoate ranging from substantially 1 part to substantially 15 parts were dissolved in a sufficient quantity of acetone to form individual solutions containing substantially 10% of said plastic compositions. The above described solutions were applied to glass panels and the resulting films were allowed to dry for 48 hours at room temperature. Thereafter the films were exposed for approximately 100 hours in the weathering unit described in Example I. The films containing substantially one part of benzyl benzoate per 100 parts of cellulose acetate-butyrate possessed only a very faint color and the films containing in excess of one part of benzyl benzoate possessed substantially no color after the weathering period. Similar films containing in place of the benzyl benzoate comparable amounts of phenyl salicylate were found upon exposure in the weathering unit to possess substantially more color than those containing benzyl benzoate.

Example VI

Films similar to those described in Example V were prepared using 15 parts of triphenyl phosphate in place of the dibutyl sebacate. The resulting films after exposure in the weathering unit were found to be superior in light resistance to similar films containing phenyl salicylate in place of the benzyl benzoate.

The hereinbefore described specific examples are solely illustrative of the unforeseen and valuable products of the present invention. Examples I, III, IV, V and VI illustrate the effectiveness of these new compositions for coating and impregnating solutions and the like. However, as is evident to those skilled in the art, there are other uses for the compositions comprising cellulose ester or nitrocellulose, a plasticizer and benzyl benzoate, for example for molding compositions. Furthermore, the scope of the present invention comprises these new compositions whether employed alone or in admixture with other materials. This invention is limited solely by the claims attached hereto.

I claim:

1. A composition of matter possessing increased light resistance to the influences of light and weather comprising a cellulose derivative selected from the group consisting of cellulose esters of lower fatty acids and nitrocellulose, a plasticizer for said cellulose derivative and from 1 to 5 parts of benzyl benzoate per 100 parts of said cellulose derivative.

2. A process of preparing a composition of matter possessing increased resistance to the influences of light and weather comprising incorporating in a cellulose derivative plastic composition containing a cellulose derivative selected from the group consisting of cellulose esters of lower fatty acids and nitrocellulose between substantially 1 part and substantially 5 parts of benzyl benzoate per 100 parts of said cellulose derivative.

3. A composition of matter possessing increased resistance to the influences of light and weather comprising nitrocellulose, a plasticizer for said nitrocellulose and from 1 to 5 parts of benzyl benzoate per 100 parts of nitrocellulose.

4. A composition of matter possessing increased resistance to the influences of light and weather comprising cellulose acetate, a plasticizer for said cellulose acetate and from 1 to 5 parts of benzyl benzoate per 100 parts of cellulose acetate.

5. A composition of matter possessing increased resistance to the influences of light and weather comprising cellulose acetate-butyrate, a plasticizer for said cellulose acetate-butyrate and from 1 to 5 parts of benzyl benzoate per 100 parts of cellulose acetate-butyrate.

RICHARD M. HITCHENS.

REFERENCES CITED

The following references are of record in the file of this patent:

UNITED STATES PATENTS

| Number | Name | Date |
|---|---|---|
| 961,360 | Lindsay | June 14, 1910 |
| 1,027,619 | Lindsay | May 28, 1912 |
| 1,233,374 | Lindsay | July 17, 1917 |
| 1,292,819 | Lindsay | Jan. 28, 1919 |
| 1,388,472 | Lindsay | Aug. 23, 1921 |
| 1,394,890 | Gault | Oct. 25, 1921 |

Certificate of Correction

Patent No. 2,455,581.                                                                 December 7, 1948.

RICHARD M. HITCHENS

It is hereby certified that error appears in the printed specification of the above numbered patent requiring correction as follows:

Column 2, line 11, for "15—15 parts" read *15–50 parts*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*